(12) United States Patent
Berger et al.

(10) Patent No.: US 6,230,174 B1
(45) Date of Patent: May 8, 2001

(54) METHOD OF GENERATING A MARKUP LANGUAGE DOCUMENT CONTAINING IMAGE SLICES

(75) Inventors: Ralf Berger, Acton; Chris D. Prosser, Cambridge, both of MA (US)

(73) Assignee: Adobe Systems Incorporated, San Jose, CA (US)

(*) Notice: Subject to any disclaimer, the term of this patent is extended or adjusted under 35 U.S.C. 154(b) by 0 days.

(21) Appl. No.: 09/151,318

(22) Filed: Sep. 11, 1998

(51) Int. Cl.[7] ...................................................... G06F 17/21
(52) U.S. Cl. .......................... 707/513; 707/517; 382/173
(58) Field of Search ................................ 707/513, 517, 707/501, 520, 521; 382/173, 176–180, 190; 345/418, 435, 114

(56) References Cited

U.S. PATENT DOCUMENTS

| | | | |
|---|---|---|---|
| 5,708,825 | * | 1/1998 | Sotomayor .......................... 600/437 |
| 5,710,877 | * | 1/1998 | Marimont et al. .................... 345/427 |
| 5,715,823 | * | 2/1998 | Wood et al. .......................... 345/427 |
| 5,778,372 | * | 7/1998 | Cordell ................................ 707/100 |
| 5,893,127 | * | 4/1999 | Tyan et al. ........................... 707/513 |

\* cited by examiner

Primary Examiner—Joseph H. Feild
(74) Attorney, Agent, or Firm—Fish & Richardson P.C.

(57) ABSTRACT

A method of generating a markup language document containing image slices in a computer graphics program running on a computer in which a portion of an original image from a computer-readable graphics document is identified as background from information stored in the graphics document. An image portion boundary is automatically computed for each non-background portion of the original image from information stored in the graphics document, and one or more image slice boundaries are computed from any overlapping image portion boundaries. An image slice and an image slice file are generated corresponding to the portion of the original image inside each image slice boundary. A markup language document is generated containing references to the image slice files.

19 Claims, 8 Drawing Sheets

METHOD OF GENERATING A MARKUP LANGUAGE DOCUMENT CONTAINING IMAGE SLICES

BACKGROUND

The present invention relates to creating markup language documents containing images from computer graphics programs.

A markup language is a conventional tool for describing the contents of an electronic document that is to be viewed or printed on a computer output device such as a computer monitor. Specifically, markup language documents, particularly hypertext markup language (HTML) documents, are commonly used by Internet browser applications. A markup language document can contain text, images, hyperlinks, and JavaScript™.

Many computer graphics programs are available for the creation of documents. Some of these computer graphics programs, such as Adobe Illustrator, have an object-based environment, i.e., visual elements are represented as individual objects which are assembled to create the desired image. Conventional computer graphics programs generate a markup language document by exporting a single image file that represents the entire document. Unfortunately, such an image file may be very large, thereby consuming network resources, increasing download time and reducing the display speed of the browser application.

Some computer graphics programs enable a user to slice an image manually, i.e., to divide the original image into discrete portions. The markup language document generated by such programs contain references to all of the image slices, so that the entire original image is downloaded. This allows a web page designer to manually add scripting language that animates the image slices. Unfortunately, this manual slicing procedure is time consuming and thus costly.

SUMMARY

In one aspect, the invention is directed a method of generating a markup language document containing image slices in a computer graphics program running on a computer. In the method, an original image is provided in a computer-readable graphics document, a portion of the original image is identified as background from information stored in the graphics document, and an image portion boundary is automatically computed for each non-background portion of the original image from information stored in the graphics document. One or more image slice boundaries are computed from any overlapping image portion boundaries. An image slice and an image slice file are generated corresponding to the portion of the original image inside each image slice boundary. A markup language document is generated containing references to the image slice files.

Implementations of the invention may include the following. One or more image slice boundaries may be computed from any non-overlapping image portion boundaries. Each image portion boundary and image slice boundary may be rectangular. The position of each image slice may be determined in a table element in the markup language document, and the table element may be stored with the position of each image slice in the markup language document. The graphics document may contain a plurality of objects, and the information may include size of each object. At least one of the objects may have multiple states, and the image portion boundary of the object may surround all of the states. At least one of the objects may have a URL property, the markup language document may be generated to include a URL reference. The graphics document may include a layer having a transparency channel, and the information may identify the non-transparent portions of the channel. The image may have a plurality of colors, one of the colors may be identified as a background color, and the information may identify the portions of the image that are not the identified color. Generating the markup language document may include generating a background image file and placing a reference to the background image file in the markup language document.

In another aspect, the invention is directed to a method of generating a markup language document containing a script in an object-based drawing environment. In the method, a graphics document having an original image is provided in an object-based drawing environment. At least one object in the graphics document is provided with multiple states having different visual appearances. A boundary for the object surrounding the visual appearance corresponding to each state is automatically computed. An image slice is generated for each state of the object, each image slice corresponding to the portion of the original image with the visual appearance associated with the state within the boundary, and a markup language document is generated containing a script that refers to the image slices.

In another aspect, the invention is directed to a method for preparing an image for display. In the method, an image is obtained in computer-readable form, a background portion of the image is identified, and image islands are identified in the image. An image island is defined by an island boundary surrounding a non-background portion of the image, wherein none of the island boundaries of the image islands overlap any of the other island boundaries. A sub-image file is generated for each image island, each sub-image file containing the corresponding portion of the image, and a markup language file is generated having a reference to each of the sub-image files. The markup language document can be rendered to cause the image to be displayed.

In another aspect, the invention is also directed to a computer program, tangibly stored on a computer-readable medium, comprising instructions for causing the computer to carry out one or more of these methods.

Advantages that may be seen in implementation of the invention include one or more of the following. A computer graphics program can automatically extract image slices from an original image. These image slices are portions of the original image that differ from the background. The graphics program can generate a series of image files corresponding to the extracted image slices and a markup language document that references the image slices. The user can add other HTML content between or around the image slices. The size of the document is reduced, thereby reducing download time. In addition, the computer program may be used to generate JavaScript animation for portions (slices) of the original image. Specifically, extracting the image slices breaks the original image into smaller pieces, thereby facilitating animation.

Other features and advantages of the invention will become apparent from the following description, including the drawings and the claims.

DETAILED DESCRIPTION

Figure 1:
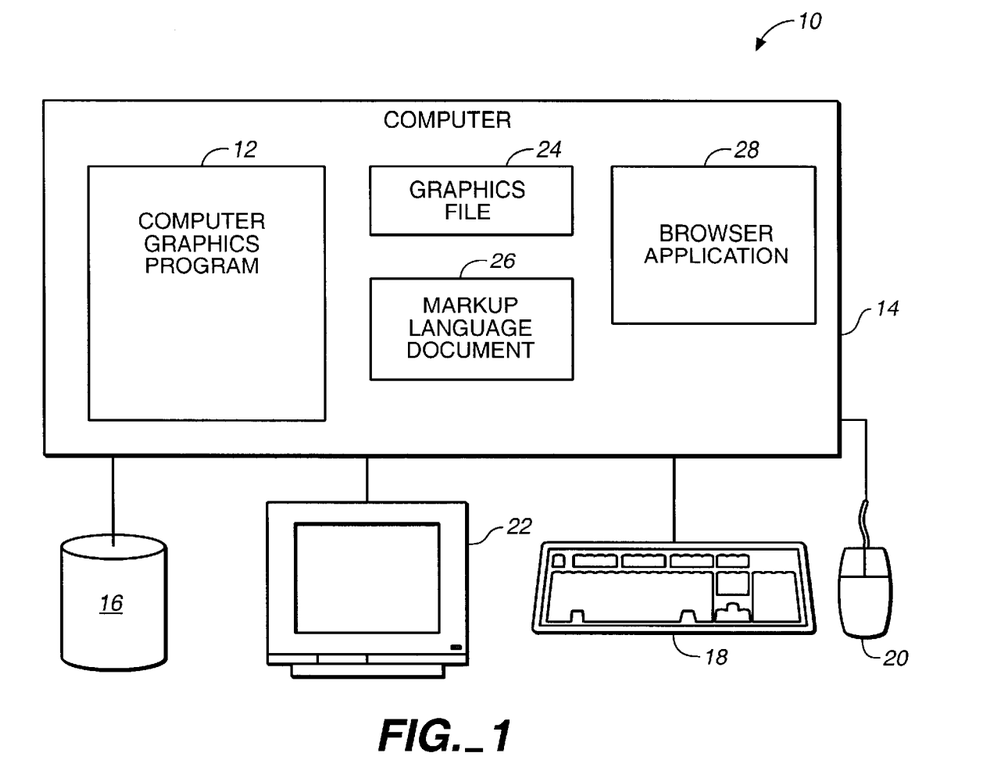
FIG. 1 is a schematic block diagram of a computer system running a dialog editor program in accordance with the invention.

As shown in FIG. 1, a computer system 10 for running a graphics program 12 includes a general purpose programmable digital computer 14 (such as a personal computer or a workstation), a mass storage device 16 (such as a hard drive), a keyboard 18, a pointer device 20 (such as a mouse), and a display 22 for displaying a markup language document 26. The computer 14 is of conventional construction, and includes a processor capable of executing computer program instructions, and a memory for storing programs and data. The computer system 10 may also include communications hardware and software by which the computer 14 may be connected to other computers, through a local area network, for example, a wide area network, or the Internet.

The graphics program 12 can be used to create and edit a graphics file 24. Advantageously, the graphics file 24 is stored as an object-based file, as this permits the addition of JavaScript animation to the markup language document. However, the graphics file can be stored as an image file in an image format, such as a GIF, JPEG, or the like. Subsequently or concurrently with the creation of the graphics file 24, the graphics program 12 can convert the graphics file 24 into the markup language document 26. The graphics program 12 uses information from the graphics file 24 to extract image slices automatically from the original image. The graphics program 12 then generates sub-image files, one for each of the image slices, and a markup language document containing the image slices in the form of references to the corresponding sub-image files.

Once the markup language document 26 has been generated, it may be viewed with a browser application 28, such as Internet Explorer™ or Netscape Navigators™. Although browser application 28 and markup language document 26 are illustrated as residing on the same computer as graphics program 12, in practice, markup language document 26 would reside on a server computer and browser application 28 would reside on a client computer, which commonly are in communication over a relatively low-speed link.

Figure 2:
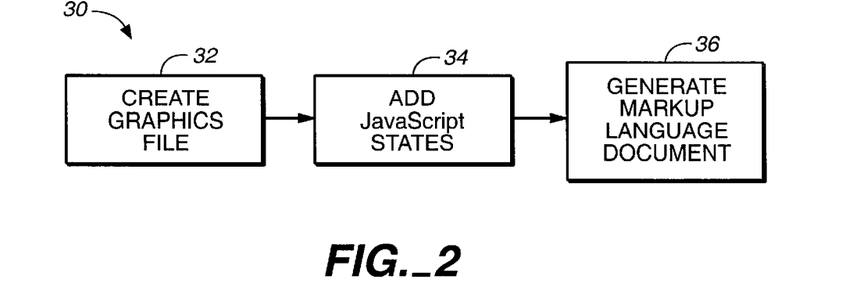
FIG. 2 is a flowchart of a process of the present invention.

A process 30 of creating a markup language document 26 that contains JavaScript animation is illustrated in FIG. 2. First, the user creates graphics file 24 in an object-based drawing environment (step 32) using a computer graphics program 12. Alternatively, a previously-created object-based graphics file can be retrieved by the graphics program 12. The user can create or edit the graphics file with conventional techniques such as dragging and dropping elements from a palette, assigning functionality to the pointer by selecting options from a tool bar, or invoking commands from a menu. As the graphics file is being created, the user can generate additional states for some of the objects (step 34). These additional states for an object correspond to the desired visual appearance of the object during JavaScript animation. Subsequent to or during the creation of the graphics file 24, a markup process can be invoked in the graphics program 12 by the user to export the graphics file 24 as a markup language document 26 (step 36). The markup language document 26 can then be edited using an HTML editor or a Web page building program such as the Adobe® PageMill® program, and with or without further editing, the document 26 can be moved or copied to another computer, such as a Web server, for viewing by a browser application.

Figure 3:
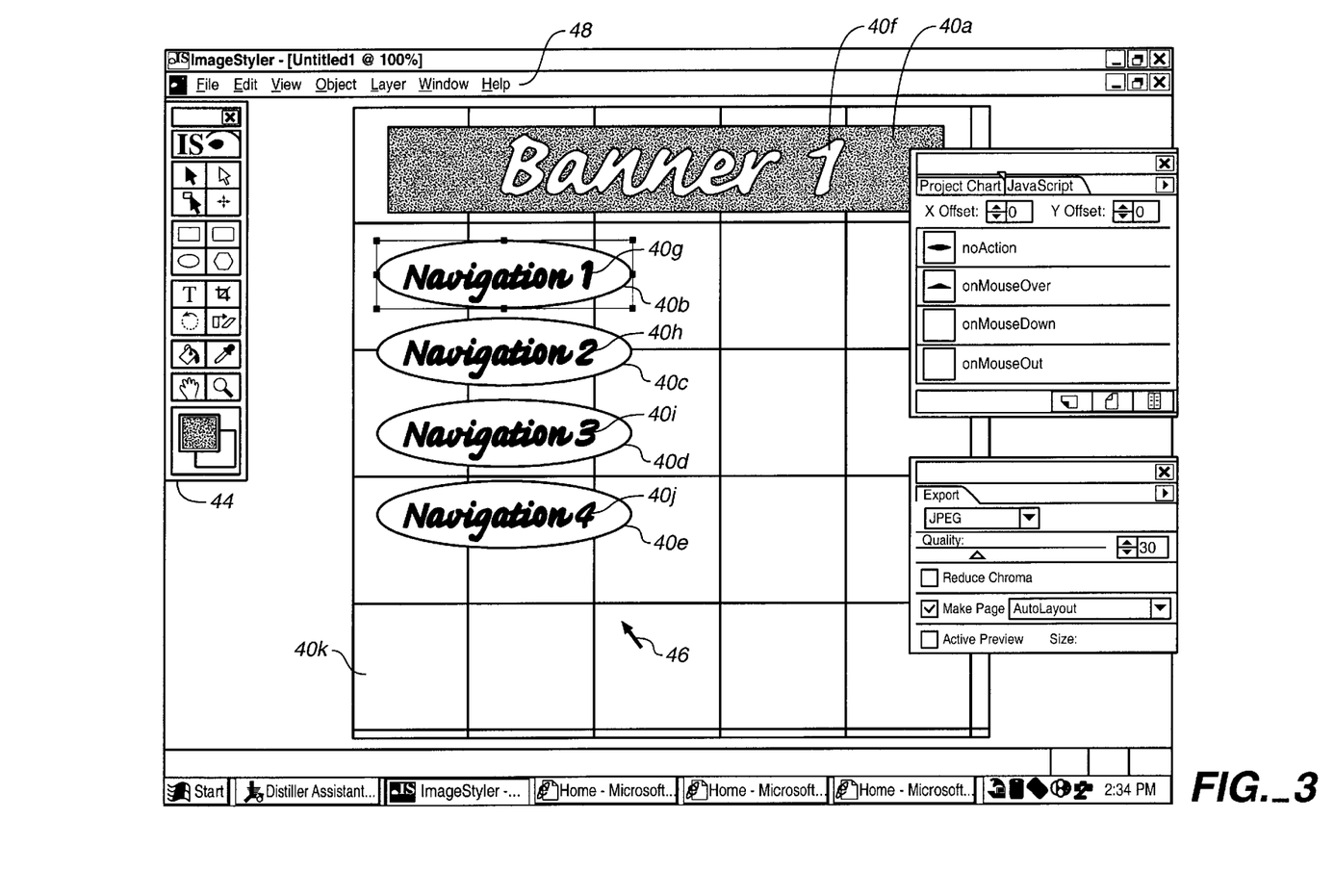
FIG. 3 is a screenshot from a computer graphics program that may be used to generate a markup language document.

As shown in FIG. 3, the graphics program 12 provides, as part of a graphical user interface, a depiction of the graphics file 24 and a set of tools to edit the graphics file 24. Aspects of the operation of the graphics program 12 will be described in terms of the information available in the graphics file and the operations the user may perform thereon.

In an illustrative example, the graphics file 24 includes a set of graphical elements 40a–40k placed on a page 42. Each graphical element may correspond to an object type that is commonly used in graphics programs. For example, the illustrated graphics file 24 includes a rectangular shape 40a, elliptical shapes 40b–40e, text objects 40f–40j. Other possible sorts of objects include images, polygons, line segments, groups and combinations. Furthermore, the graphics program 12 can define a background texture 40k, e.g., a repeating image, for the page 42.

A cursor tools palette 44 is used to assign a variety of functions to a cursor 46. For example, the cursor 46 can be used for selection of objects, movement through or cross page 42, creation of graphical shapes such as rectangles, ellipses, polygons, or line segments, insertion of text, manipulation of objects, such as by rotation or skewing, copying of object properties, changing object color, moving objects and changing magnification. Object properties can also be modified by use of a pull-down menu 48. Specifically, a uniform resource locator (URL) can be assigned as a property of the object.

The graphics program 12 can be used to simplify the process for creating JavaScript animation. Specifically, the computer graphics program 12 allows each object to have a variety of states with different properties. For example, object 40b can be assigned an elliptical shape in a first state corresponding to the "noAction" JavaScript state (see FIG. 3), and a "cloud" shape in a second state corresponding to the "onMouseOver" JavaScript state (see FIG. 4). Alternatively, the graphics program 12 may generate separate objects which share a common position attribute and which can be associated during the image slicing procedure.

Figure 4:
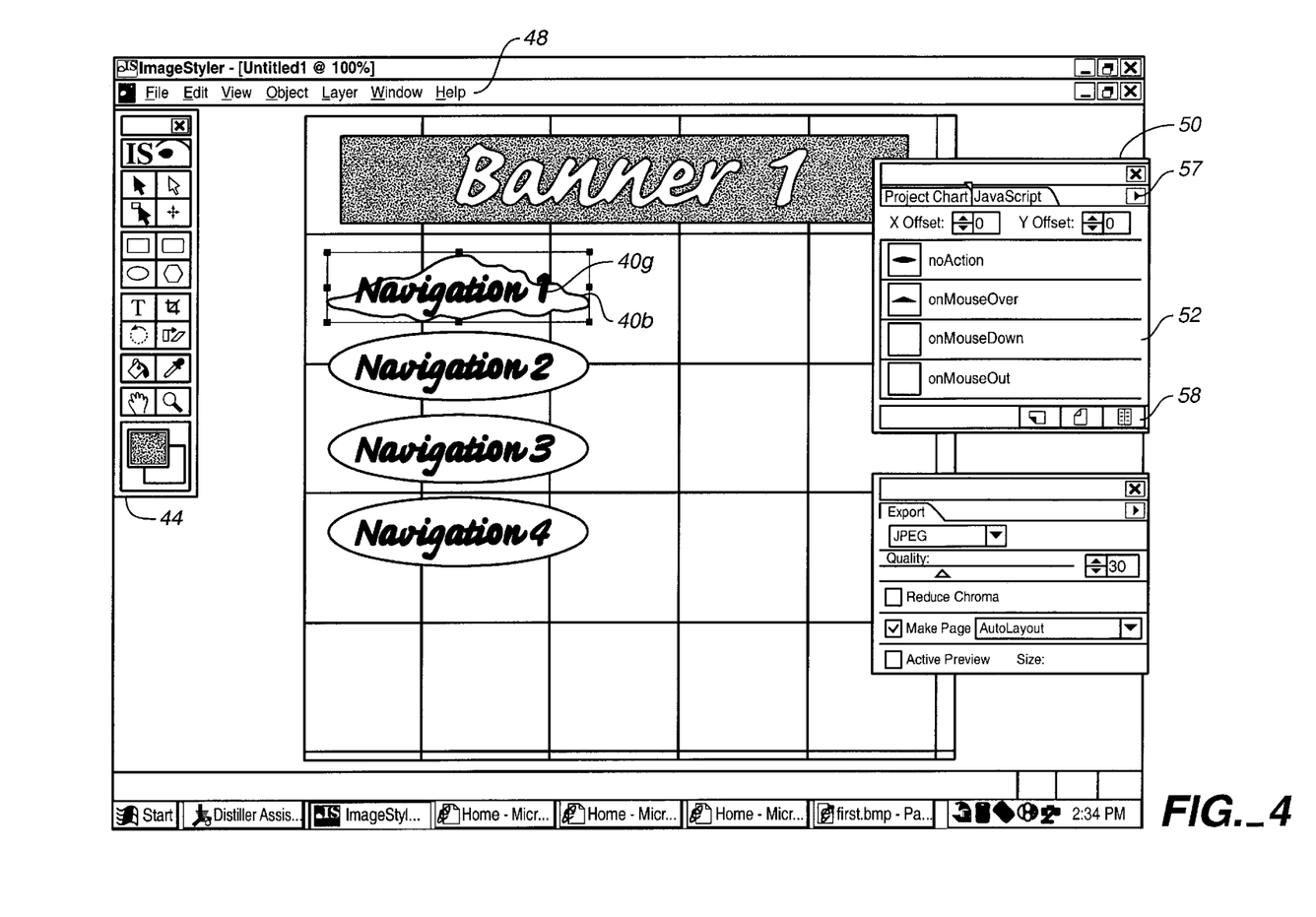
FIG. 4 is a screenshot from the graphics program illustrating generating an object with multiple states.

As shown in FIG. 4, a JavaScript animation palette 50 can be used to add additional states to an object on the page. The palette 50 includes a list 52 of the available object states. By default, an object is created in the "noAction" state (see FIG. 3). Additional states can be added to the object by pressing a "new" button 54 or a "duplicate" button 56. The additional states will be added in the following order: "onMouseOver", "onMouseDown", and "onMouseOut". The duplicate button 56 creates a new state which duplicates the properties of the object in the selected state, whereas the new button 54 creates a new state based on the properties of the "noAction" state. As each new state is added, the list entry changes from inactive to active status. Once the additional states have been created, the user can toggle display the states by selecting from the list 52, and can then edit the object properties associated with the displayed state. Changes to the properties of an object, such as color or shape, apply to only the selected state of the object. However, changes to the position of the object apply to all states. Nevertheless, the different states can be given different position properties by means of an x and y offset 57. An object state can be deleted by selecting it from the list 52 and pressing a delete button 58.

Figure 5:
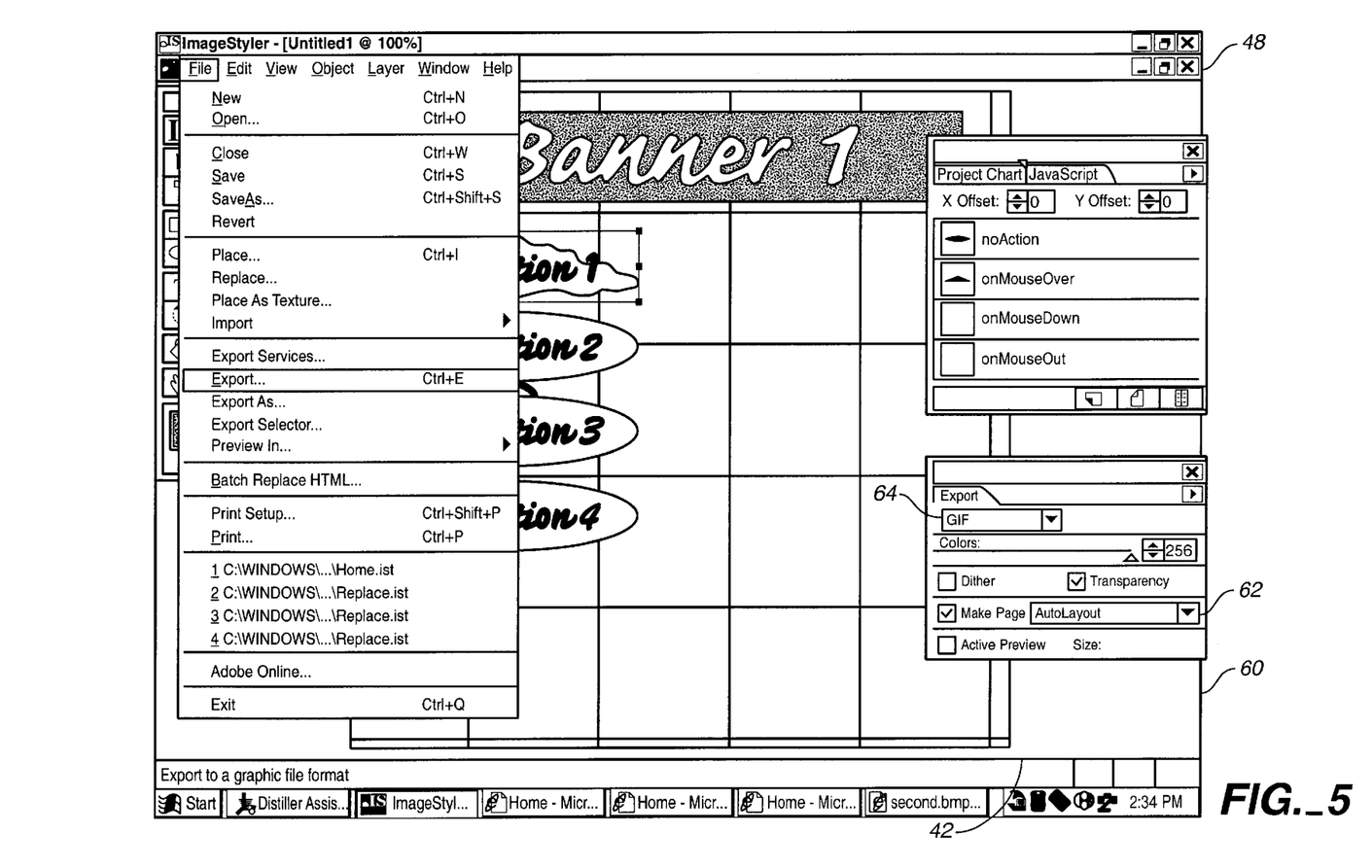
FIG. 5 is a screenshot of exporting the graphics file to create a markup language document.

As shown in FIG. 5, the user can generate a markup language document 26 by selecting an export command from the menu bar 48 or pressing a short-cut key. The user can control the format and contents of the markup language document 26 with an export palette 60. The image format of the image slices generated during export can be selected from an image format pop-up list 64. Possible choices for the image format include GIF, JPEG, and the like. In addition, the method used by computer graphics program 12 to generate the markup language document 26 can be selected from a markup language procedure pop-up list 62. Possible choices for markup language procedure 62 include "entire composition", "trimmed composition", "autoslice", and "autolayout". Each of these will be described below.

Figure 6:
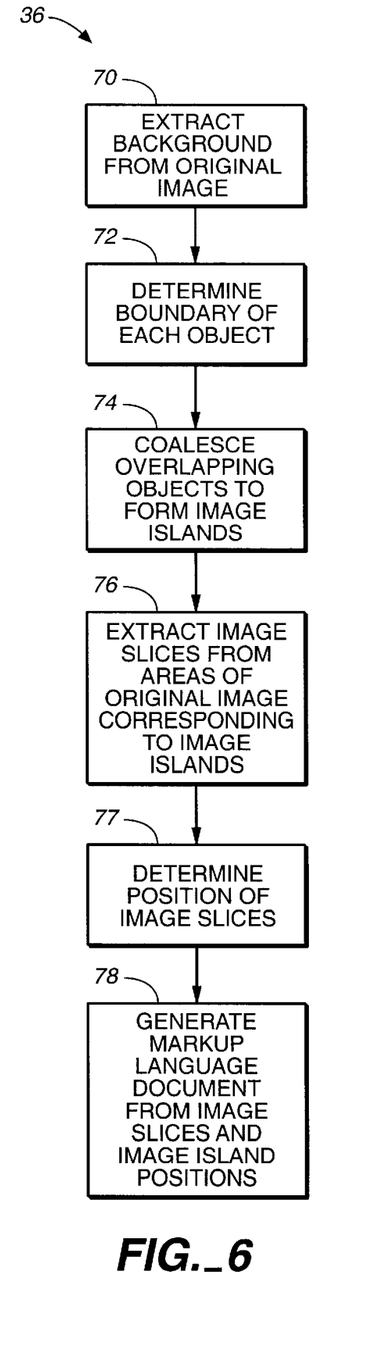
FIG. 6 is a flowchart of a process for converting the graphics file into a markup language document.

As shown in FIG. 6, in step 36 the graphics program 12 generates the markup language document 26. This step will be initially explained assuming that the "autolayout" procedure has been selected. First, a background, such as a background color, texture or repeating pattern is identified and extracted from the graphics file 24 (step 70). This can be done automatically or in response to user input identifying the background. The background is typically the bottom layer of an image. It can also be a repeating image pattern. Examples of applications that allow a user to define a background image with a repeating pattern include HTML authoring programs. If generating the background requires image data, a background image file containing the background pattern is generated. It will be referenced by the markup language document 26 when it is generated.

Next, the computer program 12 automatically slices the original image into sub-images. Initially, a bounding rectangle (which may be a square) is found for each object (step 72). In an object-based drawing environment, the bounding rectangle is based on the size and position properties of the individual object. Where the drawing environment includes an alpha channel, the bounding rectangle is based on the non-transparent regions of the object. If the object has multiple states, then the bounding rectangle is the smallest available rectangle that encompasses all the states of the object.

Figure 7A:
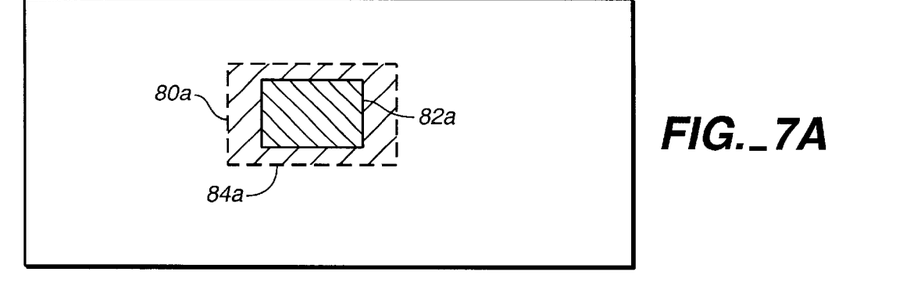
FIGS. 7A–7D are schematic block diagrams illustrating a process of forming image islands.
Figure 7B:
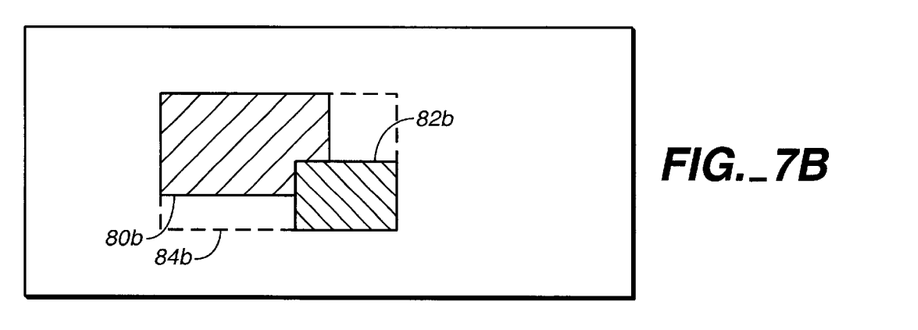
Figure 7C:
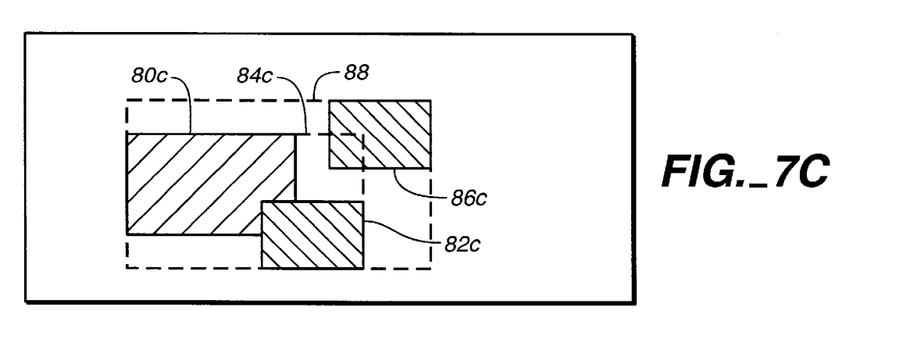

Once a bounding rectangle has been found for each object, a set of non-overlapping image islands are generated. Overlapping bounding rectangles are joined to form image islands, whereas non-overlapping bounding rectangles form their own individual image islands (step 74). To generate the image islands for overlapping bounding rectangles, a new bounding rectangle that includes each of the overlapping bounding rectangles is calculated. For example, in FIG. 7A, where object 82a is located entirely inside object 80a, the bounding rectangle 84a of the image island will be co-extensive with object 82a. On the other hand, in FIG. 7B, if object 80b and 82b partially overlap, then the bounding rectangle 84b of the image island is set to include both objects 80b and 82b. Generating image islands is an iterative process; any bounding rectangle that overlaps an image island is itself joined into the image island, possibly resulting in a new bounding rectangle. For example, in FIG. 7C, if objects 80c and 82c form an image island with a bounding rectangle 84c, and object 86c overlaps image island 84c, then a new bounding rectangle 88 is determined which encompasses image island 84c and object 86c.

Figure 7D:
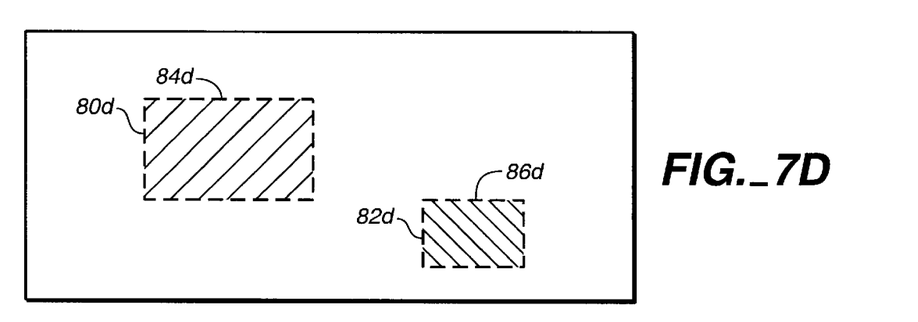

If two objects do not have overlapping bounding rectangles, then a separate image island is provided for each bounding rectangle. For example, in FIG. 7D, since objects 80d and 82d do not overlap, the graphics program 12 will treat them as individual image islands 84d and 86d.

Once the image islands have been identified in step 74, the portion of the original image inside each image island is IS saved as a separate image slice file (also referred to as a sub-image file) (step 76). In addition, the position of each image island, e.g., the upper left hand corner, is determined (step 77). Finally, the markup language document 26 is generated using the image slices and image slice positions determined in steps 76 and 77 (step 78). Specifically, the image slice files are referenced in a markup language table element that also specifies the position, size, and location of the image slice. In addition, markup language referring to the background tile is added to the document to create the repeating image pattern.

Figure 8:
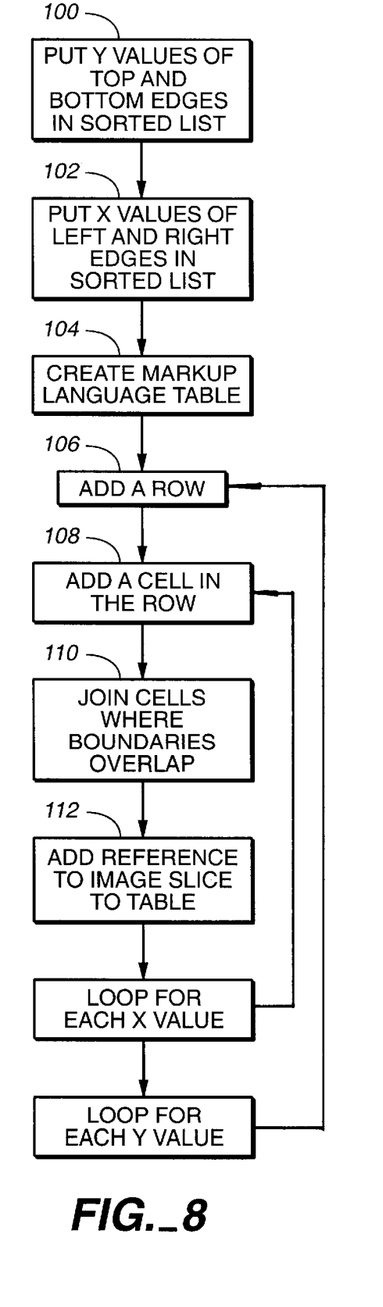
FIG. 8 is a flowchart of a process for adding a table to a markup language document.

The method of generating a markup language table element will be described in more detail with reference to FIG. 8. First, for each image island bounding rectangle, the vertical positions, e.g., Y values, of the top and bottom edges are stored in a sorted list (step 100). The Y value list also specifies whether the entry is for a top or bottom edge of the bounding rectangle. These values will determine the row boundaries of the table, and there will be one row boundary for each top and bottom edge. Similarly, for each image island bounding rectangle, the horizontal positions, e.g., the X values, of the left and right edges are stored in a sorted list (step 102). The X value list also specifies whether the entry is for a left or right edge. These values will determine the column boundaries, and there will be a column boundary for each edge, left or right.

Next, a markup language table element is created (step 104). The width of the table is the maximum X value, and it has zero spacing and padding. A sample HTML entry creating a table would be the following:

<TABLE WIDTH="(max X value)" BORDER="0" CELLSPACING="0" CELLPADDING="0">

For each Y value, a row is created in the table (step 106). A sample HTML entry adding a row to the table would be the following:

<TR> . . . </TR>

For each row, a cell is created for each X value, unless the cell would overlap with a previously created joined cell (step 108). The width of the cell is equal to the difference between the two adjacent X values, and the height of the cell is equal to the difference between the two adjacent Y values. For cells at the right and bottom perimeter of the table, the width and height are determined using the size of the original image. A sample HTML entry creating a cell would be the following:

<TD WIDTH=50 HEIGHT=100> . . . </TD>

If the cell is part of an image island, then the program decides whether to join this cell with other adjacent cells (step 110). If the image island spans multiple cells, the cells are joined together to replicate the image island. The "ROWSPAN" and "COLSPAN" attributes of the TD tag are used to specify how many adjacent cells are joined. Specifically, the graphics program accesses the type of the X or Y value, i.e. whether it is a top, left, bottom, or top edge. A sample HTML entry creating a joined cell would be the following:

<TD WIDTH=400 HEIGHT=100 COLSPAN=4> . . . </TD>

Once the cell for an image island has been defined, a reference to the image slice file can be added to the cell (step 112). A sample HTML entry defining a table cell that refers to an image slice corresponding to an image island would be the following:

<TD WIDTH=400 HEIGHT=100 COLSPAN=4>
    <IMG SCR="imagefiletitle.gif" BORDER=0 HEIGHT=100
    WIDTH=400 NAME="name" ALT=""></TD>

In addition, if the image island contains one or more objects with URLs, then an HREF or imagemap is created that includes all of the URLs. A sample HTML entry defining a table cell that contains a URL would be the following:

<TD WIDTH=400 HEIGHT=100 COLSPAN=4>
    <A HREF="http:/www.company.com">
    <IMG SCR="imagefiletitle.gif" BORDER=0 HEIGHT=100
    WIDTH=400 NAME="name" ALT=""></TD>

Since a single bounding rectangle is created that encompasses all the states of an object, the identification of the size and position of the image slices does not change with the different JavaScript states of individual objects. Consequently, JavaScript animation may be generated automatically in the markup language document. Specifically, an image slice is generated for each possible combination of available states of the objects in the island. These image slices are inserted into the table, in the form of references to sub-image files. JavaScript animation is then generated automatically by adding JavaScript state entries referring to the appropriate image slices. For example, a sample HTML entry generating JavaScript animation of an image slice containing a hyperlink would be the following:

<TD WIDTH=400 HEIGHT=100 COLSPAN=4>
    <HREF="http://www.company.com"
    ONMOUSEOUT="isimgact('name', 0)"
    ONMOUSEOVER="isimgact('name',1)">
    <IMG SCR="title" BORDER=0 HEIGHT=100 WIDTH=400
    NAME="name" ALT=""></TD>

The "isimgact" function may be defined as follows:

<HEAD>
    <Script Language="JavaScript">
    isamap=new Object();
    isamap[0]="_df"
    isamap[1]="_ov"
    isamap[2]="_to"
    isamap[3]="_dn"
    function isimgact(id, act) {
    if(document.images) document.images[id].src=eval(
    "isimages."+id+isamap[act]+"src");
    }
    if (document.images) {
    isimages.name_df=new Image();
    isimages.name_df.src="title.gif";
    isimages.name_ov=new Image();
    isimages.name_ov.src="titleOV.gif"; }
    </SCRIPT>

The "autoslice" procedure operates in substantially the same fashion as the "autolayout" procedure, but does not include the positional information for the image slices. Thus, a browser will display the resulting markup language document with the images placed in default positions, e.g., arranged in a vertical column with minimal spacing between each image slice. This may be desirable if a web page developer wishes to manually set the positions of the image slices. The "entire composition" and "trimmed composition" procedures operate in a conventional fashion.

Figure 9:
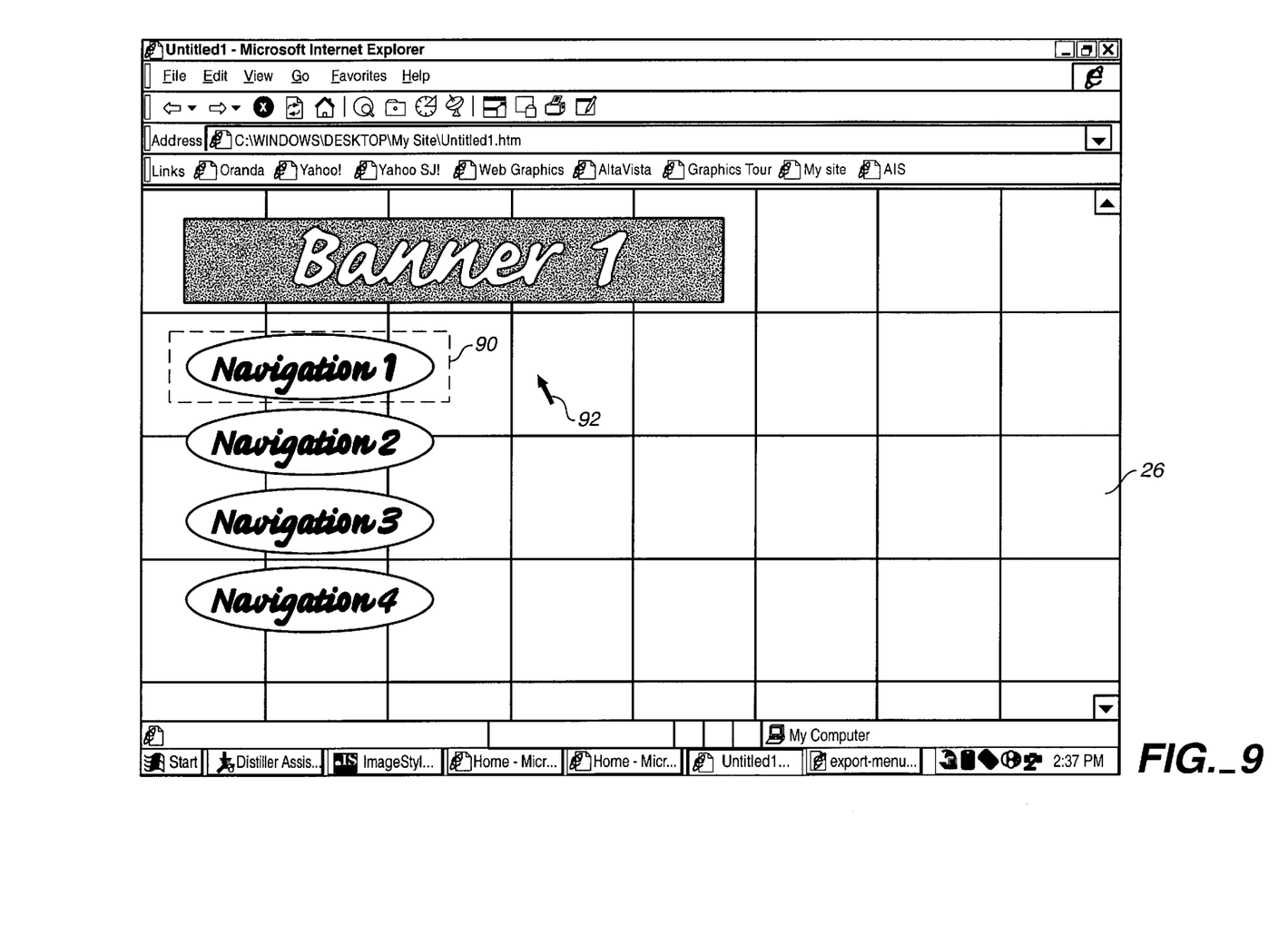
FIG. 9 is a screenshot from a browser application viewing the markup language document created in FIG. 3.
Figure 10:
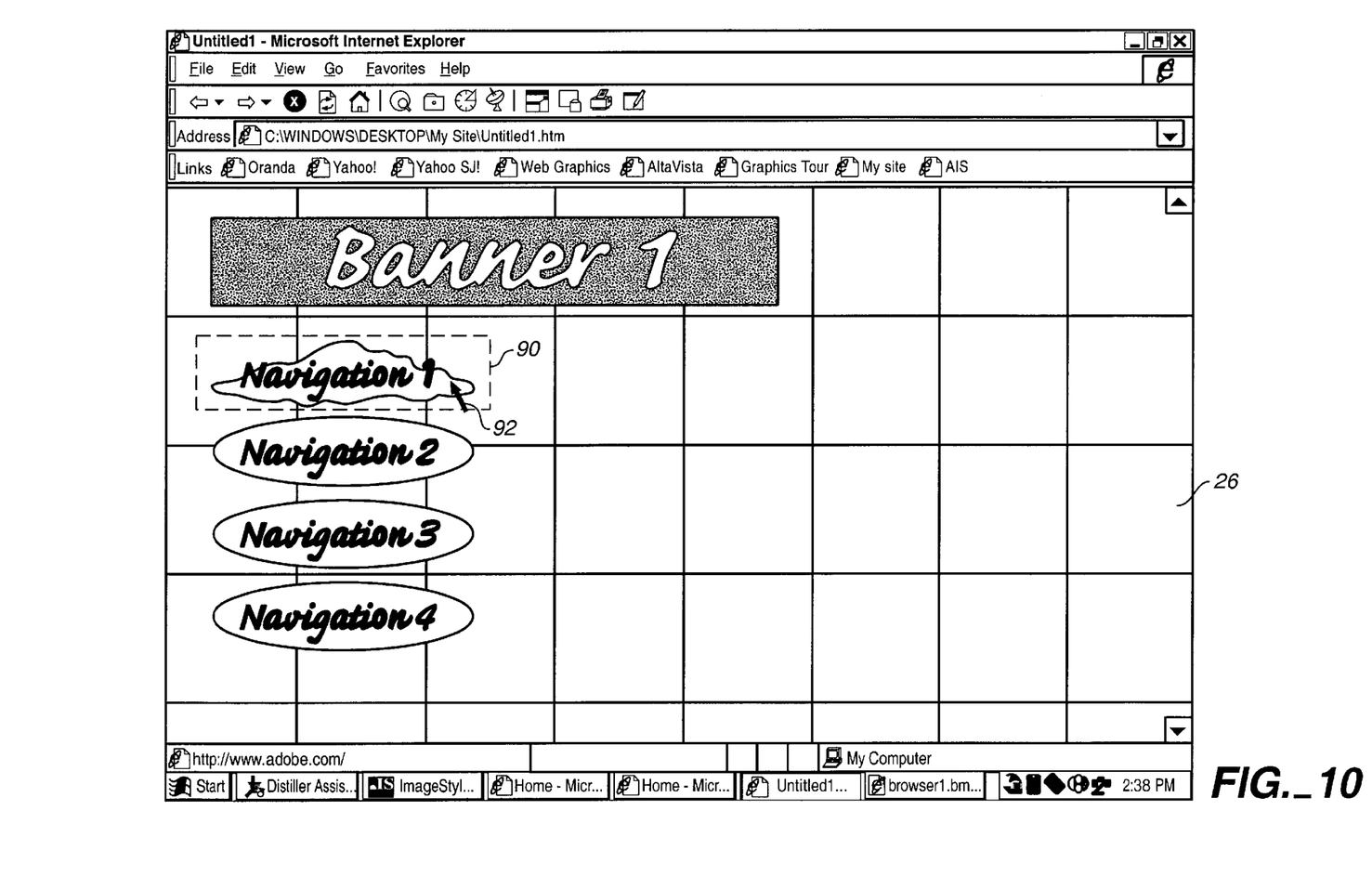
FIG. 10 is a screenshot from the browser application illustrating JavaScript animation.

As shown by FIGS. 9 and 10, once the markup language document 26 has been generated, it may be viewed with a browser application. In its normal state, the illustrated image slice 90 in the markup language document 26 shows an elliptical shape corresponding to the "noAction" state of object 40b. However, if pointer 92 is positioned over the image slice 90, then the browser displays a "cloud" shape corresponding to the "onMouseOver" state of object 40b in image slice 90, thereby providing JavaScript rollover animation.

Although the invention has been described in the context of an object-based drawing environment, aspects of the invention can also be implemented in a non-object based drawing environment, such as an image processing application or a painting application. However, the JavaScript animation features are easiest to implement in an object-based drawing environment. In an image processing environment, such as Adobe Photoshop, that includes an alpha layer or alpha channel information, the bounding rectangles can be based on the non-transparent portions of the image layer. In an image processing environment with layers, different layers of the image could provide different JavaScript animation states. These states would be displayed in the graphics program by changing the transparency of the layers. In a painting environment, a specific color can be designated as a background color, and the bounding rectangles can be based on the regions of the image that do not have a specified color.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

The invention has been described in terms of particular embodiments. Other embodiments are within the scope of the following claims. For example, the steps of the invention can be performed in a different order and still achieve desirable results. The operation of the graphics program can be limited to a single computer or it may be distributed across a computer network. The boundaries can be defined by simple closed shapes other than rectangles, in which case the sub-image files would include a mask or clipping path defining the shape.

What is claimed is:

1. In a computer graphics program running on a computer, a method of generating a markup language document containing image slices, comprising:

providing an original image in a computer-readable graphics document;

identifying a portion to the original image as background from information stored in the graphics document;

computing an image portion boundary for each non-background portion of the original image from information stored in the graphics document;

computing one or more image slice boundaries from any overlapping image portion boundaries;

generating an image slice corresponding to the portion of the original image inside each image slice boundary and an image slice file for each image slice; and generating a markup language document containing references to the image slice files.

2. The method of claim 1, further comprising computing one or more image slice boundaries from any non-overlapping image portion boundaries.

3. The method of claim 1, wherein each image portion boundary and image slice boundary is rectangular.

4. The method of claim 1, further comprising:

determining the position of each image slice in a table element in the markup language document; and storing the table element with the position of each image slice in the markup language document.

5. The method of claim 1, wherein the graphics document contains a plurality of objects, and the information includes the dimensions of each object.

6. The method of claim 5, wherein at least one of the objects has multiple states having different visual appearances, and the image portion boundary of the object surrounds all of the states.

7. The method of claim 5, wherein at least one of the objects has a URL property, and wherein generating the markup language document includes adding a URL reference.

8. The method of claim 1, wherein the graphics document includes a layer having a transparency channel, and the information identifies the non-transparent portions of the channel.

9. The method of claim 1, wherein the image has a plurality of colors, the method further comprises identifying one of the colors as a background color, and the information identifies the portions of the image that are not the identified color.

10. The method of claim 1, wherein generating the markup language document includes generating a background image file and placing a reference to the background image file in the markup language document.

11. In an object-based drawing environment, a method of generating a markup language document containing a script, comprising:

providing a graphics document having an original image in an object-based drawing environment;

providing at least one object in the graphics document with multiple states having different visual appearances;

computing a boundary for the object, the boundary surrounding all of the states;

generating an image slice for each state of the object, each image slice corresponding to the portion of the original image with the visual appearance associated with the state within the boundary; and generating a markup language document containing a script that refers to the image slices.

12. A method for preparing an image for display, comprising:

obtaining an image in computer-readable form;

identifying a background portion of the image;

identifying image islands in the image, an image island being defined by an island boundary surrounding a non-background portion of the image, wherein none of the island boundaries of the image islands overlap any of the other island boundaries;

generating a sub-image file for each image island, each sub-image file containing the corresponding portion of the image; and generating a markup language file having a reference to each of the sub-image files, wherein the markup language document can be rendered to cause the image to be displayed.

13. The method of claim 12, further comprising:

receiving a user input identifying a background color, pattern, or texture of the image.

14. The method of claim 12, wherein the island boundaries are all rectangular.

15. A computer program, tangibly stored on a computer-readable medium, for compositing a set of ordered image layers, the computer program comprising instructions for causing a computer to:

provide an original image in a computer-readable graphics document;

identify a portion of the original image as background from information stored in the graphics document;

automatically compute an image portion boundary for each non-background portion of the original image from information stored in the graphics document;

compute one or more image slice boundaries from any overlapping image portion boundaries;

generate an image slice corresponding to the portion of the original image inside each image slice boundary and an image slice file for each image slice; and generate a markup language document containing references to the image slice files.

16. The method of claim 1, wherein the graphics document contains a plurality of objects, and the information includes position of each object.

17. The method of claim 11, wherein the script creates animation by causing different image slices to be displayed sequentially.

18. The method of claim 17, wherein the script causes different image slices to be displayed in response to positioning of a pointer.

19. A method of generating a markup language document containing image slices, comprising:

providing an image in a computer-readable document, wherein the image has background information and a plurality of objects, and wherein each object includes position information;

identifying the background information;

computing an image portion boundary for each object from the position information;

computing one or more image slice boundaries from any overlapping image portion boundaries;

generating one or more image slices and respective image slice files for each image slice boundary, wherein an image slice file includes data of the objects contained within the corresponding image slice boundary; and generating a markup language document containing references to the image slice files, wherein a change in a reference to an image slice file causes the image to change.

* * * * *

UNITED STATES PATENT AND TRADEMARK OFFICE
CERTIFICATE OF CORRECTION

| | |
|---|---|
| PATENT NO. | : 6,230,174 B1 |
| DATED | : May 8, 2001 |
| INVENTOR(S) | : Chris D. Prosser and Ralf Berger |

It is certified that error appears in the above-identified patent and that said Letters Patent is hereby corrected as shown below:

<u>Column 9,</u>
Line 17, please delete "to" and insert -- of -- therefor.

Signed and Sealed this

Fourteenth Day of May, 2002

Attest:

Attesting Officer

JAMES E. ROGAN
Director of the United States Patent and Trademark Office